(12) United States Patent
Langendorf et al.

(10) Patent No.: US 9,638,790 B2
(45) Date of Patent: May 2, 2017

(54) SYSTEM FOR CALIBRATING A DISTANCE MEASURING DEVICE

(71) Applicant: Endress + Hauser GmbH + Co. KG, Maulberg (DE)

(72) Inventors: Bjorn Langendorf, Hag-Ehrsberg (DE); Michael Sturm, Lorrach (DE); Harald Faber, Lorrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 14/969,003

(22) Filed: Dec. 15, 2015

(65) Prior Publication Data

US 2016/0178733 A1    Jun. 23, 2016

(30) Foreign Application Priority Data

Dec. 17, 2014 (DE) .................. 10 2014 118 862

(51) Int. Cl.
| | |
|---|---|
| *G01C 3/00* | (2006.01) |
| *G01S 7/40* | (2006.01) |
| *G01F 23/284* | (2006.01) |
| *G01S 13/88* | (2006.01) |
| *G01S 17/08* | (2006.01) |

(52) U.S. Cl.
CPC .......... *G01S 7/4052* (2013.01); *G01F 23/284* (2013.01); *G01S 13/88* (2013.01); *G01S 17/08* (2013.01); *G01S 2007/4086* (2013.01)

(58) Field of Classification Search
CPC ... G01B 11/002; G01B 11/24; G01B 11/2441; G01B 11/026; G01B 11/14; G01B 2290/15; G01B 9/02027; G01B 9/02039; G01B 9/02057; G01B 9/02072; G01B 11/005; G01B 21/042; G01B 2290/35; G01B 9/02002
See application file for complete search history.

(56) References Cited

U.S. PATENT DOCUMENTS

| | | | |
|---|---|---|---|
| 2004/0085615 A1* | 5/2004 | Hill ................... | G02B 26/0825 359/288 |
| 2016/0320489 A1* | 11/2016 | Send .................... | G01S 17/003 |

\* cited by examiner

*Primary Examiner* — Michael P Stafira
(74) *Attorney, Agent, or Firm* — Bacon & Thomas, PLLC

(57) ABSTRACT

The invention relates to a system for calibrating a distance measuring device, comprising: a measuring track, on which the distance measuring device is mountable; an areal reflector mountable shiftably on the measuring track for reflecting a measurement signal transmitted from the distance measuring device back to the distance measuring device, so that by means of the distance measuring device a distance measurement for determining a distance (D) between the distance measuring device and the reflector is performable; and a laser distance measuring device mountable on the measuring track for registering tilt of the reflector; wherein means for orienting the distance measuring device are provided, so that measurement signals of the distance measuring device reflected back to the distance measuring device by means of the reflector are received with maximum intensity by the distance measuring device.

7 Claims, 3 Drawing Sheets

SYSTEM FOR CALIBRATING A DISTANCE MEASURING DEVICE

TECHNICAL FIELD

The invention relates to a distance measuring device. In the case of the distance measuring device, especially of concern is a fill-level measuring device for determining the fill level of a liquid or a bulk good in a container by means of radar technology.

BACKGROUND DISCUSSION

Radar measuring devices for fill level measurement are produced and sold by Endress +Hauser in a number of different embodiments. A freely radiating radar measuring device is offered, for example, under the mark "Micropilot". Microwaves are radiated toward the medium via an antenna. The EM-waves reflected on the surface of the medium are received back by the measuring device and an echo function formed, which shows echo amplitude as a function of distance. From this function, the wanted echo is ascertained and the associated travel time is determined. Based on the travel time, the distance between the antenna of the radar measuring device and the medium is determined.

There are different measuring methods known, of which pulse radar and frequency modulation continuous wave radar (FMCW radar) represent the most common. In the case of pulse radar, short microwave pulses are periodically transmitted and the pulses reflected on the surface of the medium received back. The received signal amplitude as a function of, time represents the echo function, wherein each value of a reflected echo corresponds to a certain distance from the antenna.

In the case of the FMCW method, a continuous microwave is transmitted, which is periodically frequency modulated. The frequency of the received signal has at the point in time of receipt a certain difference compared with the frequency of the transmission signal, and this difference depends on the travel time of the echo. Determinable from the frequency difference is, thus, the distance between antenna and medium. The echo function is represented by a Fourier spectrum of the mixed signal of the transmission signal and the received signal.

Frequently used for calibrating distance measuring devices, especially the mentioned radar measuring devices, is a measuring track, whose length corresponds to the measuring range of the distance measuring device, and on which an areal reflector, also called a strike plate, is shiftably arranged. The distance measuring device to be calibrated is positioned, for example, at the starting point of the measuring track, the measurement signal is transmitted in the direction of the reflector and the reflected measurement signal is received back. In the case of a radar measuring device, the distance between radar measuring device and reflector is determined based on the signal travel time. The measured distance is compared with a reference value, which was determined by means of a calibration standard. The calibration standard is, for example, a laser interferometer with an accuracy higher by a defined factor than the accuracy of the distance measuring device to be calibrated. As a rule, a number of measurement points are used for determining the linearity.

Distance measuring devices include, as a rule, a flange, on which a directional antenna is arranged. As a result of welding or screwing procedures, the directional antenna can become tilted on the flange, whereby the accuracy of the distance measuring device is lessened.

SUMMARY OF THE INVENTION

An object of the invention is to provide a system for calibrating a distance measuring device. The system should provide an increased accuracy of the distance measuring device. An additional object of the invention is a method, by means of which the distance measuring device can be calibrated with increased accuracy.

The first object is achieved according to the invention by a system for calibrating a distance measuring device, comprising: a measuring track, on which the distance measuring device is mountable; an areal reflector mountable shiftably on the measuring track for reflecting a measurement signal transmitted from the distance measuring device back to the distance measuring device, so that by means of the distance measuring device a distance measurement for determining a distance between the distance measuring device and the reflector is performable; a laser distance measuring device mountable on the measuring track for registering tilt of the reflector; wherein means for orienting the distance measuring device are provided, so that measurement signals of the distance measuring device reflected back to the distance measuring device by means of the reflector are received by the distance measuring device with maximum intensity.

In an advantageous embodiment, the reflector is removable from the radiation path of the measurement signals of the distance measuring device, so that the laser distance measuring device can determine a distance between the distance measuring device and the laser distance measuring device.

In an advantageous further development, the reflector includes a lengthwise displaceable holder, such that a lengthwise displacement of the holder brings the reflector into the radiation path or out of the radiation path.

In an advantageous form of embodiment, an evaluation unit is provided, which from a change of the distance between the laser distance measuring device and the distance measuring device deduces an accuracy of the calibrating.

In an advantageous variant, the measuring track includes at least one rail, wherein the reflector has at least one rail wheel, by means of which the reflector is shiftable on the at least one rail.

The second object of the invention is likewise achieved by a method. The method of the invention is a method for calibrating a distance measuring device by means of a measuring track, which has a laser distance measuring device, comprising method steps as follows: mounting the distance measuring device on the measuring track, such that the distance measuring device and the laser distance measuring device stand opposite one another; arranging an areal reflector between the distance measuring device and the laser distance measuring device, such that measurement signals transmitted by the distance measuring device are reflected on the reflector; orienting the reflector by means of the laser distance measuring device, such that the reflector is arranged perpendicular to the measuring track; orienting the distance measuring device parallel to the reflector, such that measurement signals of the distance measuring device reflected back by the reflector are received with maximum intensity by the distance measuring device; and calibrating the distance measuring device with shifting of the reflector along the measuring track.

In an advantageous further development, before each calibrating, the reflector is removed from the measuring track, in order to determine the distance between the distance measuring device and the laser distance measuring device, in order to compensate for temperature influences and length changes.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
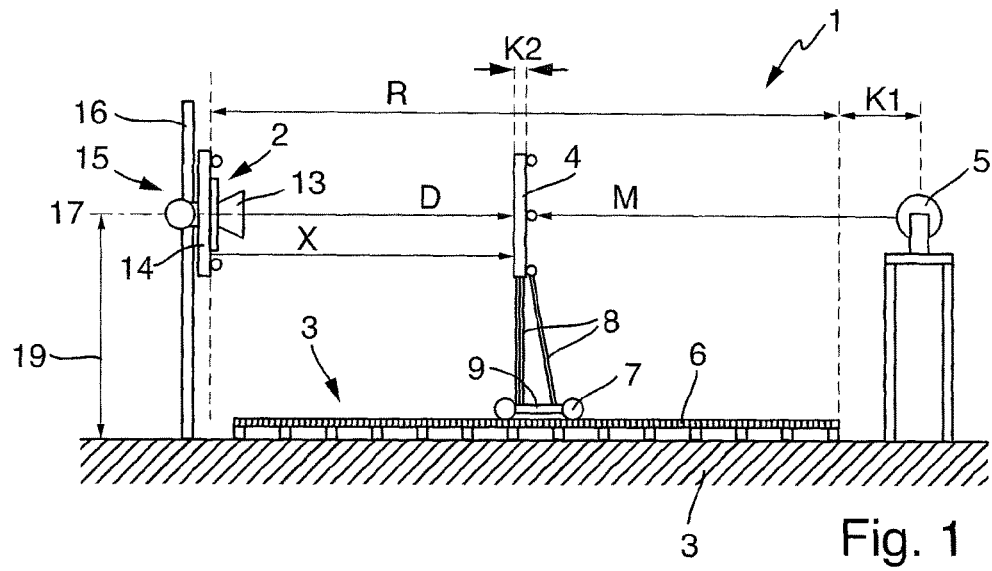
FIG. 1 is a schematic longitudinal section of a system for calibrating a distance measuring device.

FIG. 1 shows a schematic longitudinal section of a system 1 for calibrating a distance measuring device 2, comprising a horizontal measuring track 3, on which the distance measuring device 2 is mountable. An areal reflector 4 is arranged shiftably on the measuring track 3. The reflector 4 reflects a measurement signal transmitted from the distance measuring device 2 back toward the distance measuring device 2. Using this arrangement, a distance measurement can be made for determining a distance D between the distance measuring device 2 and the reflector 4. The reflector 4 simulates the fill level of a fill-level measuring device and is mounted by means of a holder 8 on a reflector carriage 9. The reflector carriage 9 includes four rail wheels 7, which roll on two rails 6 of the measuring track 3, whereby the reflector carriage 9 can shift by traveling on the rails 6 by way of a servo control and gear drive (not shown). By shifting the reflector carriage 9 on the rails 6, the distance D between the distance measuring device 2 and the reflector 4 can be varied, whereby different fill levels can be simulated. The distance measuring device 2 is located during the entire time of the calibrating (duration about 1-2 h) at a measurement height 19 of two meters.

The measuring track 3 has on an end of the measuring track 3 lying opposite the distance measuring device 2 a laser distance measuring device 5, which is embodied as a laser tracker. The laser distance measuring device 5 serves to measure a measurement distance M between the laser distance measuring device 5 and the back of the reflector 4. Furthermore, the laser distance measuring device 5 is suitable for ascertaining a total length R of the measuring track 3. The ascertaining of the measurement distance M and the total length R serves for checking the measured distance D.

K2 designates a thickness of the reflector 4. K1 designates the distance between the laser distance measuring device 5 and the beginning of the measuring track 3. The sum of the constants K1 and K2 is defined as the constant K: K=K1+K2 and is likewise required for checking the calibration. This occurs by means of measuring a distance X between an orienting plate 14 of the distance measuring device 2 and the reflector 4. The constant K equals:

$K=K1+K2=R-M-X$

The distance X between the distance measuring device 2 and the reflector 4 can be calculated as follows:

$X=R-M-K.$

The measuring track 3 includes a rod 16, which has a seating plate 15 for the distance measuring device 2. The distance measuring device 2 is secured to the seating plate 15 and defines an optical axis 17 perpendicular to the seating plate 15, respectively to the rod 16.

The distance measuring device 2 includes a directional antenna 13 and an orienting plate 14. These are welded or screwed together. Due to tolerances or inaccuracies, which arise during the welding, respectively screwing, it can occur that the distance measuring device 2, in spite of optimal seating in the seating plate 15, does not completely "see" the reflector 4, this meaning that the radar waves of the distance measuring device 2 do not travel exactly parallel to the optical axis 17. In order to correct this, the distance measuring device 2 must be oriented. In order to orient the distance measuring device 2 by means of the laser distance measuring device 5, the reflector 4 must be removed from the optical axis 17.

Figure 2A:
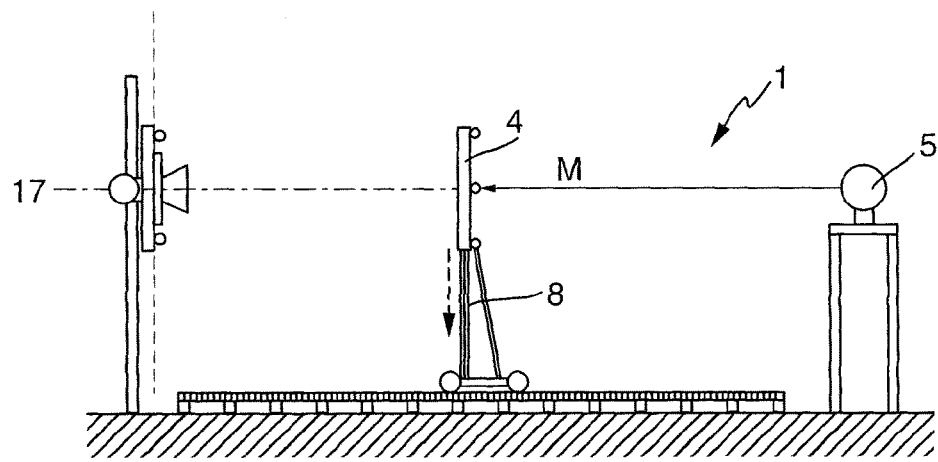
FIG. 2a is a schematic longitudinal section of a system for calibrating a distance measuring device with a reflector in the optical axis.
Figure 2B:
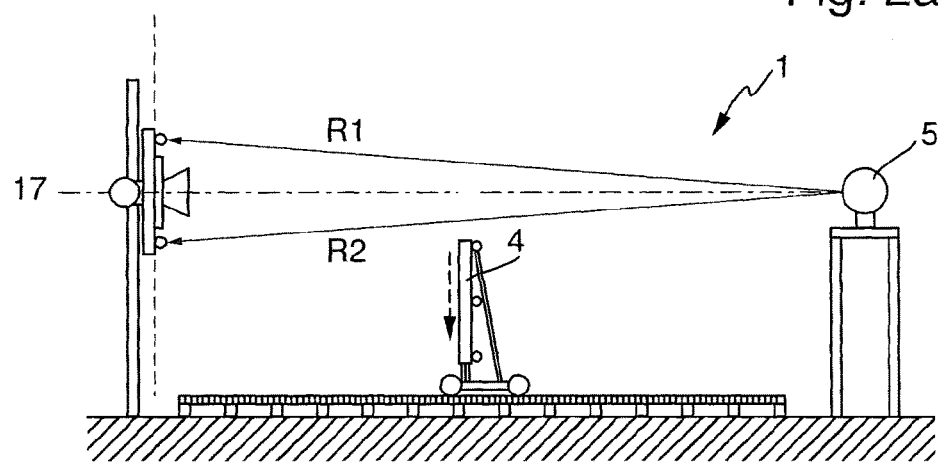
FIG. 2b is a schematic longitudinal section of a system for calibrating a distance measuring device with a reflector away from the optical axis.

FIG. 2a shows a reflector 4 in the optical axis 17 and FIG. 2b shows a reflector 4 away from the optical axis 17. With the help of the lengthwise displaceable holder 8, the reflector 4 can be moved downwards (see dashed arrow) while maintaining its vertical orientation, so that the laser rays can reach the orienting plate 14. A servomotor (not shown) is used to create the movement. Movement stops at a predetermined motor position.

With help of the reflector carriage 9, the reflector 4 can be shifted to simulate any fill level for the distance measuring device 2. The reflector carriage 9 includes four rail wheels 7, which roll on rails 6. The rails 6 are embodied as toothed racks. The reflector carriage 9 includes a motor (not shown), to which a gear (not shown) is secured. If the motor turns, the reflector carriage 9 moves via the gear and the rails 6 along the measuring track 3. The movement of the reflector carriage 9 occurs with very small velocity.

To orient the distance measuring device 2, the laser distance measuring device 5 registers the distance measuring device 2 at different positions in the seating plate 15. Then, the signal strength of the distance measuring device 2 is queried at the different positions. Through an algorithm, which checks signal strength and accordingly activates motors of the seating plate 15, the distance measuring device 2 is so tilted horizontally and vertically that the distance measuring device 2 has the maximum signal strength and, thus, sees the reflector 4 optimally.

Figure 3A:
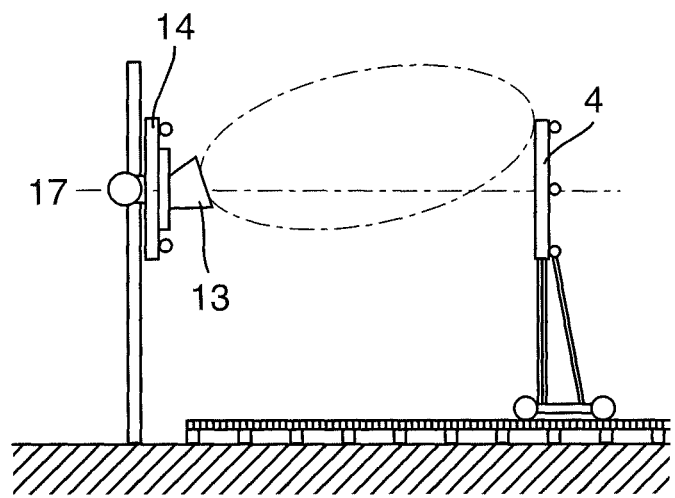
FIG. 3a is a schematic longitudinal section of a system for calibrating a distance measuring device with an unoriented distance measuring device.
Figure 3B:
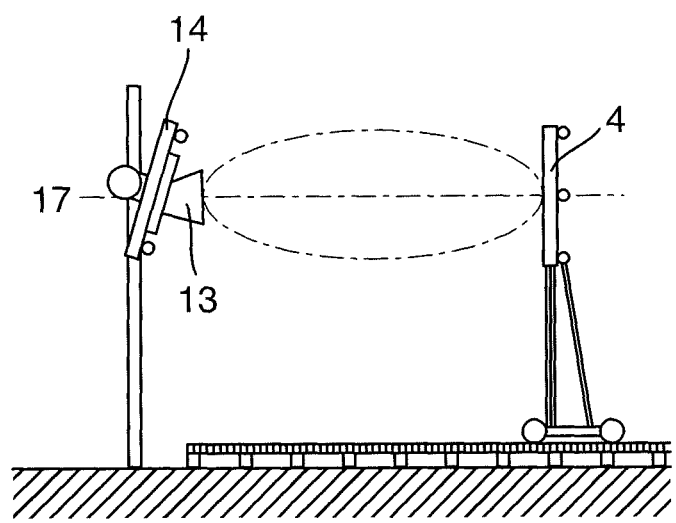
FIG. 3b is a schematic longitudinal section of a system for calibrating a distance measuring device with an oriented distance measuring device.

FIG. 3a shows an unoriented distance measuring device 2 and FIG. 3b shows an oriented distance measuring device 2. The distance measuring device 2 can be oriented by means of two methods. In a first variant, the distance measuring device 2 can be oriented using the laser distance measuring device, and, in a second variant, the distance measuring device 2 is oriented by adjusting for maximum reflection of the electromagnetic waves reflected on the reflector 4.

The orienting is important, since the directional antenna 13 with a horn radiator, a flange, etc. can become tilted as a result of welding or screwing procedures, after which the accuracy of the distance measuring device 2 is no longer assured.

Figure 4:
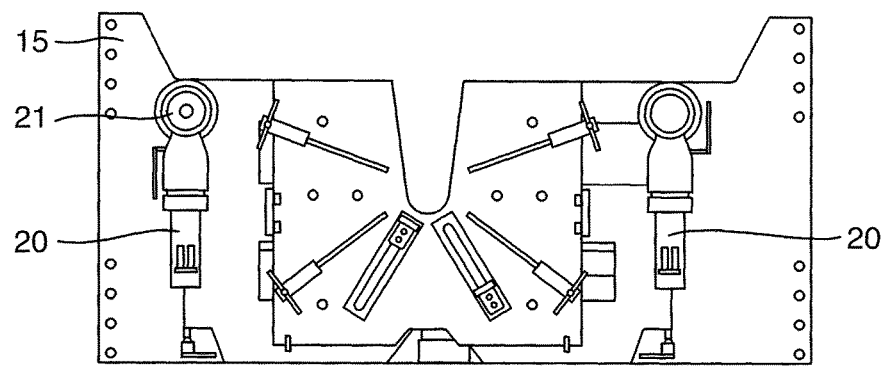
FIG. 4 is a side view of a seating plate.

FIG. 4 shows a side view of a seating plate 15. The distance measuring device 2 is oriented in the vertical and horizontal directions. For this, two servomotors 20 are provided. Via a hollow shaft, angular transmission 11 and a threaded spindle (not shown), the rotating movement of the servomotors 20 is converted into a linear movement.

In order to receive electromagnetic waves reflected on the reflector optimally, a grid with defined measurement points is placed on the reflector and the locations of the grid visited with the directional antenna. After each measuring point, a measured value is requested. If the complete grid is visited and it is known, at which measuring point the best measured value is present, the directional antenna can be oriented.

Furthermore, it is necessary to ascertain the total length R (see FIG. 1) of the measuring track, in order to compensate for temperature expansions. This is done before each calibration. In order to be able to measure with the laser distance measuring device 5 to the orienting plate 14, the reflector 4 must be rotated away. The ascertaining of the total length R occurs only after the orienting of the directional antenna 13, in order to be able to register tilting of the distance measuring device 2 and consequent changes of the distance X.

Figure 5:
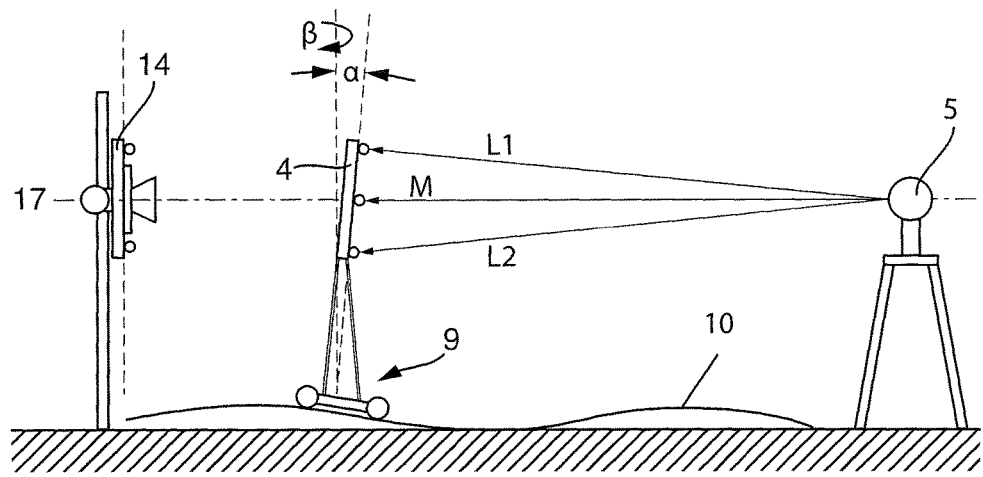
FIG. 5 is a schematic longitudinal section of a system with a measuring track having an uneven floor.

FIG. 5 shows a schematic longitudinal section of a system 1 with a reflector carriage 9, which is arranged on an uneven floor of the measuring track 3. Due to the irregularities of the floor of the measuring track 3, there is the danger that the reflector 4 becomes horizontally and/or vertically tilted. It is necessary to compensate for this tilting. In such case, the current position of the reflector 4 is again registered with the laser distance measuring device 5. Then, via two servomotors (not shown), the reflector 4 can be re-oriented.

The laser distance measuring device 5 must be able to measure through to the distance measuring device 2. In order to make this possible, the reflector 4 is moved downwards via the lengthwise displaceable holder 8. Then, the laser distance measuring device 5 can measure past the reflector 4.

The orientation of the reflector 4 occurs according to the same principle as the orientation of the distance measuring device 2. The reflector 4 is oriented vertically as well as horizontally via two motors and an angular transmission (both not shown).

Figure 6:
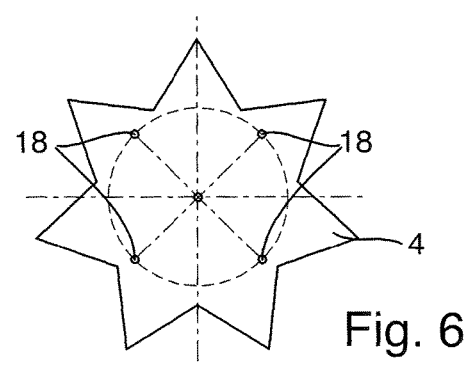
FIG. 6 is a side view of a back of a reflector.

FIG. 6 shows a back of a reflector 4, as viewed from the laser distance measuring device 5. Arranged on the reflector 4 are four reflector eyes 18 for registering tilt by the laser distance measuring device 5.

Additionally, a reflector eye 18 is placed in the center of the reflector 4, in order to ascertain the measurement distance M.

The distances L1 and L2 (see FIG. 5) to the reflector eyes 18 change as a function of the distance M to the reflector 4 and must be determined anew after each measuring setup.

The method of the invention for calibrating the distance measuring device 2 by means of a measuring track 3 with a laser distance measuring device 5 transpires in the following way.

First, the distance measuring device 2 is mounted on the measuring track 3, so that the distance measuring device 2 and the laser distance measuring device 5 stand opposite one another. Then, the reflector 4 is arranged between the distance measuring device 2 and the laser distance measuring device 5, so that the measurement signals transmitted from the distance measuring device 2 are reflected on the reflector 4. As a next step, the reflector is 4 oriented by means of the laser distance measuring device 5, so that the reflector 4 is arranged perpendicular to the measuring track 3. Then, the distance measuring device 2 is oriented parallel to the reflector 4, such that the measurement signals of the distance measuring device 2 reflected back by the reflector 4 are received with maximum intensity by the distance measuring device 2. Finally, the distance measuring device 2 is calibrated, wherein the reflector 4 is shifted along the measuring track 3.

Before each calibrating, the reflector 4 is removed from the measuring track 3, in order to determine the distance R between the distance measuring device 2 and the laser distance measuring device 5, in order to be able to compensate for temperature influences and length changes.

The invention claimed is:

1. A system for calibrating a distance measuring device, comprising:
    a measuring track, on which the distance measuring device is mountable;
    an areal reflector mountable shiftably on said measuring track for reflecting a measurement signal transmitted from the distance measuring device back to the distance measuring device, so that by means of the distance measuring device a distance measurement for determining a distance (D) between the distance measuring device and the reflector is performable;
    a laser distance measuring device mountable on said measuring track for registering tilt of said reflector 4; and
    means for orienting the distance measuring device, so that measurement signals of the distance measuring device reflected back to the distance measuring device by means of said reflector are received by the distance measuring device with maximum intensity.

2. The system as claimed in claim 1, wherein:
    said reflector is removable from the radiation path of the measurement signals of the distance measuring device, so that said laser distance measuring device can determine a distance (R) between the distance measuring device and said laser distance measuring device.

3. The system as claimed in claim 2, wherein:
    said reflector includes lengthwise displaceable holder, so that a lengthwise displacement of said holder brings said reflector into the radiation path or out of the radiation path.

4. The system as claimed in claim 1, further comprising:
    an evaluation unit, which from a change of the distance (R) between said laser distance measuring device and the distance measuring device deduces an accuracy of the calibrating.

5. The system as claimed in claim 1, wherein:
    said measuring track includes at least one rail; and
    said reflector includes at least one rail wheel, by means of which said reflector is shiftable on said at least one rail.

6. A method for calibrating a distance measuring device by means of a measuring track, which has a laser distance measuring device, comprising the steps as follows:
    mounting the distance measuring device on the measuring track, such that the distance measuring device and the laser distance measuring device stand opposite one another;
    arranging an areal reflector between the distance measuring device and the laser distance measuring device, such that measurement signals transmitted by the distance measuring device are reflected on the reflector;

orienting the reflector by means of the laser distance measuring device, such that the reflector is arranged perpendicular to the measuring track;
orienting the distance measuring device parallel to the reflector, such that measurement signals of the distance measuring device reflected back by the reflector are received with maximum intensity by the distance measuring device; and
calibrating the distance measuring device with shifting of the reflector (4) along the measuring track.

7. The method as claimed in claim 6, wherein:
before each calibrating, the reflector is removed from the measuring track, in order to determine a distance (R) between the distance measuring device and the laser distance measuring device, in order to compensate for temperature influences and length changes.

\* \* \* \* \*